(12) United States Patent
Wang

(10) Patent No.: US 8,149,029 B2
(45) Date of Patent: Apr. 3, 2012

(54) ELECTRONIC DEVICE WITH OPTICAL MODULE

(75) Inventor: Tao Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 196 days.

(21) Appl. No.: 12/767,838

(22) Filed: Apr. 27, 2010

(65) Prior Publication Data

US 2010/0321087 A1    Dec. 23, 2010

(30) Foreign Application Priority Data

Jun. 19, 2009    (CN) .......................... 2009 1 0303462

(51) Int. Cl.
*H03L 7/00* (2006.01)
(52) U.S. Cl. ......... 327/143; 327/310; 327/311; 327/398
(58) Field of Classification Search .................. 327/143, 327/310, 311, 398
See application file for complete search history.

(56) References Cited

U.S. PATENT DOCUMENTS

| | | | | | |
|---|---|---|---|---|---|
| 3,560,767 | A | * | 2/1971 | Traub | 327/143 |
| 4,035,669 | A | * | 7/1977 | Yokoyama | 327/143 |
| 4,520,418 | A | * | 5/1985 | Susi | 361/92 |
| 5,561,389 | A | * | 10/1996 | Duley | 327/143 |
| 6,867,574 | B2 | * | 3/2005 | Silic | 323/284 |

* cited by examiner

*Primary Examiner* — Kenneth B. Wells
(74) *Attorney, Agent, or Firm* — Altis Law Group, Inc.

(57) ABSTRACT

An electronic device includes an optical module, a power source module powering the optical module, a processor, a controller, and a switch module. The processor generates and maintains a delay signal for a first predetermined time in response to determination that the power source module is powered on. The processor further generates a driving signal upon determination that the first predetermined time has elapsed. The controller generates and maintains a control signal for a second predetermined time in response to determination that the power source module is powered on. The switch module is turned on to establish an electrical connection between the power source module and the optical module according to the driving signal, and turned off to cut off the electrical connection according to the control signal.

17 Claims, 2 Drawing Sheets

ELECTRONIC DEVICE WITH OPTICAL MODULE

BACKGROUND

1. Technical Field

The present disclosure relates to electronic devices, and more particularly to an electronic device with an optical module.

2. Description of Related Art

Electronic devices such as media players, often use an optical module to write/read information to/from optical media. However, upon powering up, the optical module may receive transient high-voltage from the power supply/source. As such, damage may result, and service life of the optical module be decreased.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the two views.

DETAILED DESCRIPTION

Figure 1:
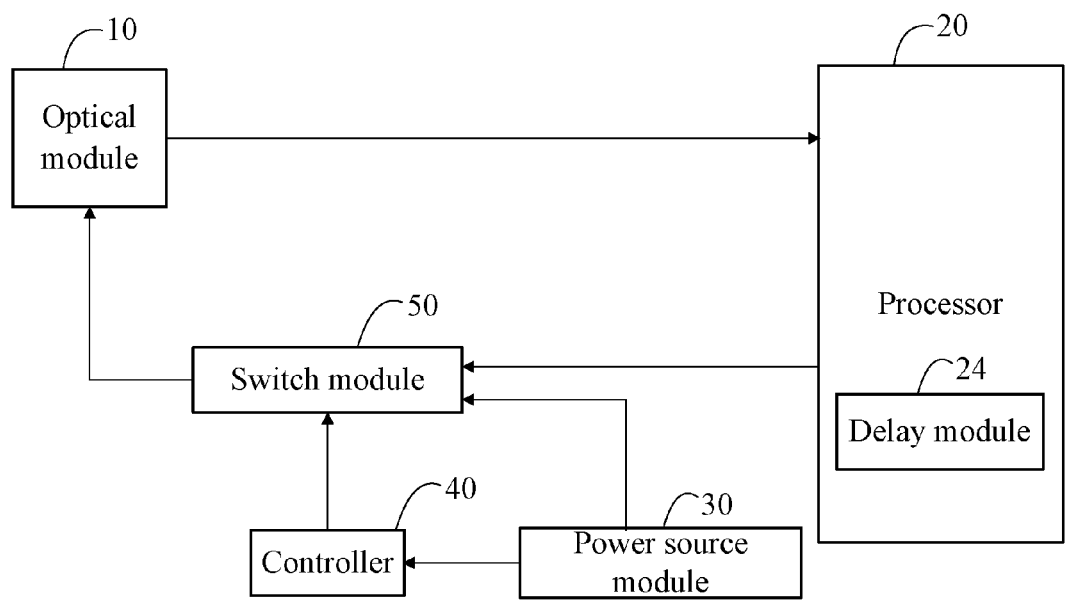
FIG. 1 is a schematic, functional block diagram of an electronic device, in accordance with an exemplary embodiment.

Referring to FIG. 1, an electronic device 100 according to an exemplary embodiment is illustrated. The electronic device 100, such as an optical media player, includes an optical module 10, a processor 20, a power source module 30, a controller 40, and a switch module 50.

The optical module 10 is configured for writing information to an optical medium (not shown), and reading information from the optical medium. In this embodiment, the optical module 10 is an optical pickup head (OPU). The OPU emits light to the medium and receives the light reflected from the medium, so as to write/read information to/from the medium. When the medium is a compact disc (CD), the OPU emits infrared laser light with a wave length of 780 nanometer (nm). When the medium is a digital video disc (DVD), the OPU emits red laser light with a wave length of 650 nm.

The power source module 30 is configured for powering the optical module 10.

The processor 20 is configured for receiving operational commands, and generating a driving signal accordingly. In response to the operational commands, the processor 20 is further configured for recognizing the medium to be read or written to. When the medium is a CD, the processor 20 generates a first driving signal. When the medium is a DVD, the processor 20 generates a second driving signal. In this embodiment, the driving signal (the first driving signal and the second driving signal) is a low level signal. The processor 20 is further configured for receiving feedback from the optical module 10, and adjusting the operation of the optical module 10 accordingly.

The processor 20 includes a delay module 24. The delay module 24 is configured for generating and maintaining output of a delay signal for a first predetermined time in response to the determination that the power source module 30 is powered on. The processor 20 generates the driving signal upon determination that the first predetermined time has elapsed. After the first predetermined time, the delay signal terminates and the processor 20 outputs the driving signal. The first predetermined time can be modified by the delay module 24. In this embodiment, the delay module 24 is a procedure embedded in the processor 20, and the first predetermined time is stored in the processor 20 as a factory set value. In other embodiments, the delay module 24 can be a circuit with delay function.

Figure 2:
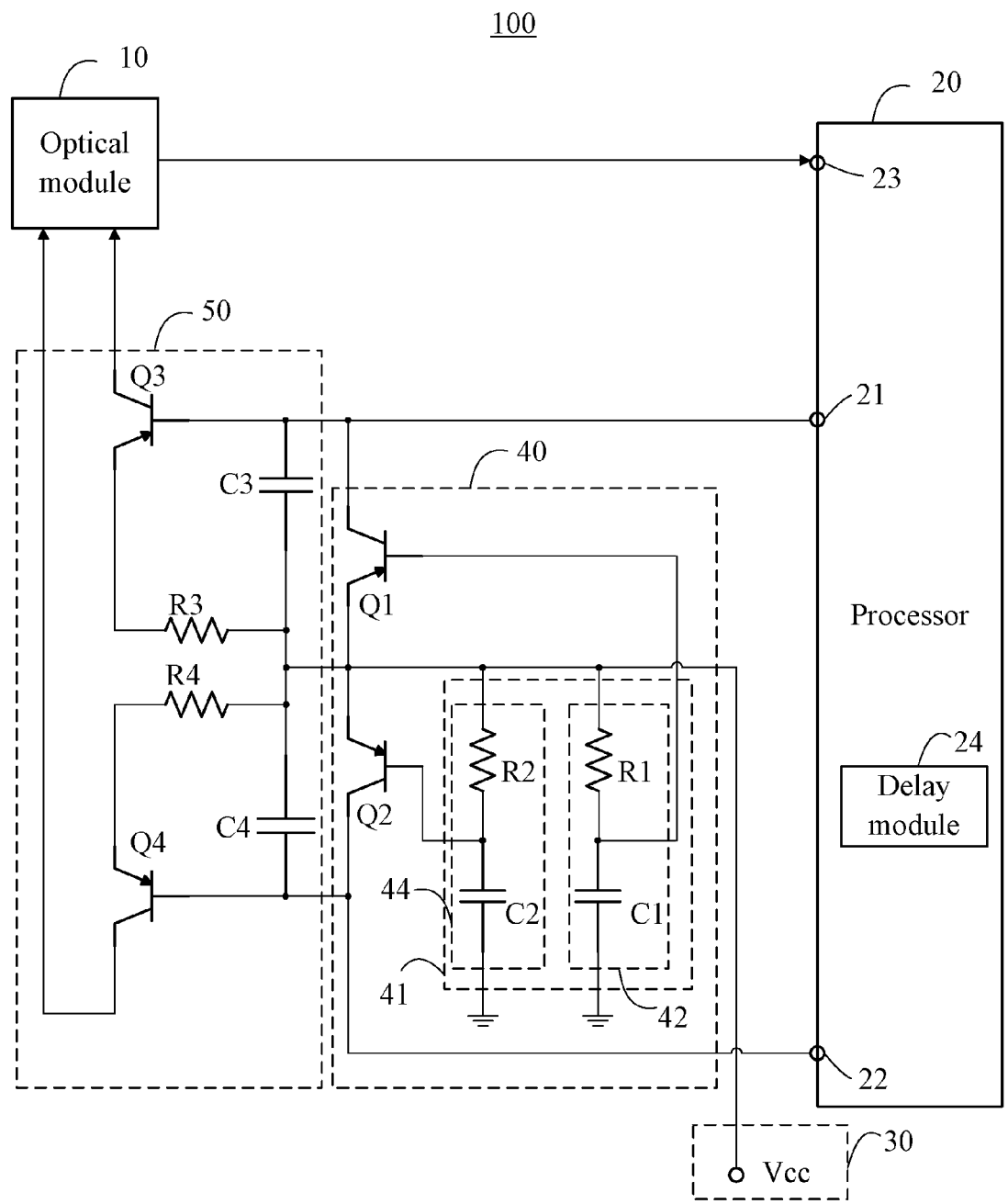
FIG. 2 is a partial circuit diagram of the electronic device of FIG. 1.

Further referring to FIG. 2, the controller 40 is configured for generating and maintaining output of a control signal for a second predetermined time in response to determination that the power source module 30 is powered on. The controller 40 includes a maintaining unit 41. The maintaining unit 41 is configured for maintaining the output of the control signal for the second predetermined time. The control signal terminates upon determination that the second predetermined time has elapsed. The second predetermined time can be modified by the maintaining unit 41. In this embodiment, the second predetermined time is a factory set value.

The switch module 50 is configured for enabling an electrical connection between the power source module 30 and the optical module 10 when the switch module 50 is turned on, and further for disabling the electrical connection between the power source module 30 and the optical module 10 when the switch module 50 is turned off. The switch module 50 is turned on according to the driving signal and turned off according to the control signal.

As discussed, the switch module 50 is turned off according to the control signal generated by the controller 40 in response to determination that the power source module 30 is powered on. The processor 20 delays output of the driving signal according to the delay signal generated by the delay module 24. After the two predetermined times, the control signal and the delay signal terminate, and the processor 20 outputs the driving signal to the switch module 50. The switch module 50 is turned on to enable the electrical connection between the power source module 30 and the optical module 10, and the optical module 10 is powered by the power source module 30.

In this embodiment, the processor 20 is a digital signal processing (DSP) chip. The processor 20 includes a first pin 21, a second pin 22, and a third pin 23. The first pin 21 outputs the first driving signal. The second pin 22 outputs the second driving signal. The third pin 23 receives the feedback from the optical module 10. The power source module 30 includes a power source Vcc.

The controller 40 includes a first transistor Q1, a second transistor Q2, a first delay circuit 42, and a second delay circuit 44. The maintaining unit 41 consists of the first delay circuit 42 and the second delay circuit 44. The first delay circuit 42 delays the first control signal as an input of the first transistor Q1 for the second predetermined time. The first delay circuit 42 includes a first resistor R1 and a first capacitor C1. The second delay circuit 42 delays the second control signal as an input of the second transistor Q2 for the second predetermined time. The second delay circuit 44 includes a second resistor R2 and a second capacitor C2.

One terminal of the first resistor R1 is electrically connected to the power source Vcc. The other terminal of the first resistor R1 is electrically grounded via the first capacitor C1. One terminal of the second resistor R2 is electrically connected to the power source Vcc. The other terminal of the second resistor R2 is electrically grounded via the second capacitor C2. A base of the first transistor Q1 is electrically connected to the first resistor R1 and the first capacitor C1. A collector of the first transistor Q1 is electrically connected to the first pin 21. An emitter of the first transistor Q1 is electrically connected to the power source Vcc. A base of the second transistor Q2 is electrically connected to the second resistor R2 and the second capacitor C2. A collector of the second transistor Q2 is electrically connected to the second pin 22. An emitter of the second transistor Q2 is electrically connected to the power source Vcc.

The switch module 50 includes a third transistor Q3, a fourth transistor Q4, a third resistor R3, a fourth resistor R4, a third capacitor C3, and a fourth capacitor C4. A base of the third transistor Q3 is electrically connected to the first pin 21. A collector of the third transistor Q3 is electrically connected to the optical module 10. An emitter of the third transistor Q3 is electrically connected to the power source Vcc via the third resistor R3. One terminal of the third capacitor C3 is electrically connected to the base of the third transistor Q3. The other terminal of the third capacitor C3 is electrically connected to the power source Vcc. A base of the fourth transistor Q4 is electrically connected to the second pin 22. A collector of the fourth transistor Q4 is electrically connected to the optical module 10. An emitter of the fourth transistor Q4 is electrically connected to the power source Vcc via the fourth resistor R4. One terminal of the fourth capacitor C4 is electrically connected to the base of the fourth transistor Q4. The other terminal of the fourth capacitor C4 is electrically connected to the power source Vcc.

In this embodiment, the four transistors Q1, Q2, Q3, and Q4 are PNP type bipolar junction transistors. The four resistors R1, R2, R3, and R4 are configured for controlling current. The two capacitors C1 and C2 are configured for generating the second predetermined time for the two delay circuits 41 and 42, respectively. The two capacitors C3 and C4 are used for straightening at bypass.

In this embodiment, the two pins 21 and 22 have the same working principle, and the working principle of the first pin 21 follows.

When the power source Vcc is enabled, the first capacitor C1 is charged to behave similar to be shorted, and the delay unit 24 of the processor 20 continues to generate the delay signal for the first predetermined time. The processor 20 delays output of the first driving signal according to the delay signal generated for the first predetermined time.

The base of the first transistor Q1 is at a low level voltage by the first capacitor C1 which is electrically grounded. The emitter of the first transistor Q1 is at a high level voltage by the power source Vcc. Thus, the base-emitter voltage of the first transistor Q1 exceeds a breakover voltage of the first transistor Q1. The first transistor Q1 turns on. The collector of the first transistor Q1 outputs a high level voltage to the base of the third transistor Q3. The emitter of the third transistor Q3 receives a high level voltage supported by the power source Vcc. Thus, the base-emitter voltage of the third transistor Q3 falls below a breakover voltage of the third transistor Q3. The third transistor Q3 turns off.

Thus, the third transistor Q3 disables the electrical connection between the power source Vcc and the optical module 10 in response to determination that the power source module 30 is powered on. The optical module 10 avoids encountering high-voltage transients from the power source Vcc.

As the first capacitor C1 is charged for the second predetermined time, the base voltage of the first transistor Q1 becomes so great that the base-emitter voltage of the first transistor Q1 falls below the breakover voltage of the first transistor Q1. The first transistor Q1 turns off. The delay signal terminates upon determination that the first predetermined time has elapsed, and the processor 20 outputs the first driving signal to the base of the third transistor Q3. Thus, the base-emitter voltage of the third transistor Q3 exceeds the breakover voltage of the third transistor Q3. The third transistor Q3 turns on to enable the electrical connection between the power source Vcc and the optical module 10. The optical module 10 is powered by the power source module 30.

In other embodiments, the four transistors Q1, Q2, Q3, and Q4 can be other electrical switches, such as metal oxide semiconductor (MOS) transistors.

It is to be understood, however, that even though numerous embodiments have been described with reference to particular embodiments, but the present disclosure is not limited to the particular embodiments described and exemplified, and the embodiments are capable of considerable variation and modification without departure from the scope of the appended claims.

What is claimed is:

1. An electronic device, comprising:
   an optical module;
   a power source module for powering the optical module;
   a processor generating and maintaining output of a delay signal for a first predetermined time in response to determination that the power source module is powered on, and further generating a driving signal upon determination that the first predetermined time has elapsed;
   a controller generating and maintaining output of a control signal for a second predetermined time in response to determination that the power source module is powered on; and
   a switch module turned on to establish an electrical connection between the power source module and the optical module according to the driving signal, and further turned off to cut off the electrical connection between the power source module and the optical module according to the control signal.

2. The electronic device of claim 1, wherein the processor comprises a delay unit generating and maintaining output of the delay signal for the first predetermined time in response to determination that the power source module is powered on.

3. The electronic device of claim 2, wherein the first predetermined time is capable of modification according to preference.

4. The electronic device of claim 1, wherein the controller comprises a maintaining unit sustaining generation of the control signal by the controller for the second predetermined time.

5. The electronic device of claim 4, wherein the second predetermined time is capable of modification according to preference.

6. The electronic device of claim 4, wherein the controller further comprises a first transistor, the maintaining unit comprises a first delay circuit delaying the first control signal as an input of the first transistor for the second predetermined time.

7. The electronic device of claim 6, wherein the first delay circuit comprises a first resistor and a first capacitor, one terminal of the first resistor is electrically connected to the power source module, the other terminal of the first resistor is electrically grounded via the first capacitor, a base of the first transistor is electrically connected to the first resistor and the first capacitor, a collector of the first transistor is electrically connected to the processor, and an emitter of the first transistor is electrically connected to the power source module.

8. The electronic device of claim 7, wherein the first transistor is a PNP type bipolar junction transistor.

9. The electronic device of claim 7, wherein the switch module comprises a second transistor, a second resistor, and a second capacitor, a base of the second transistor is electrically connected to the processor, a collector of the second transistor is electrically connected to the optical module, an emitter of the second transistor is electrically connected to the power source module via the second resistor, one terminal of the second capacitor is electrically connected to the base of the second transistor, and the other terminal of the second capacitor is electrically connected to the power source module.

10. The electronic device of claim 9, wherein the second transistor is a PNP type bipolar junction transistor.

11. The electronic device of claim 9, wherein the second predetermined time is capable of modification according to preference.

12. The electronic device of claim 9, wherein in response to determination that the power source module is powered on, the first capacitor is charged to behave similar to be shorted, and the processor generates and maintains output of the delay signal for the first predetermined time, the first transistor is turned on and the second transistor is turned off, the electrical connection between the power source module and the optical module is disabled as the second transistor turns off, the first transistor is on for the second predetermined time which is relative to the charged time of the first capacitor.

13. The electronic device of claim 12, wherein the base voltage of the first transistor is cut off upon determination that the second predetermined time has elapsed, the processor outputs the driving signal to turn on the second transistor upon determination that the first predetermined time has elapsed, and the second transistor is conducted to enable the electrical connection between the power source module and the optical module.

14. An electronic device, comprising:
an optical module;
a power source module;
a switch module electrically coupled to the optical module; and
a controller comprising a first transistor, a first resistor, and a first capacitor, one terminal of the first resistor electrically connected to the switch module and the power source module, the other terminal of the first resistor electrically grounded via the first capacitor, a base of the first transistor electrically connected to the first resistor and the first capacitor, a collector of the first transistor electrically connected to the switch module, an emitter of the first transistor electrically connected to the power source module; and a processor electrically coupled to the switch module.

15. The electronic device of claim 14, wherein the first transistor is a PNP type bipolar junction transistor.

16. The electronic device of claim 14, wherein the switch module comprises a second transistor, a second resistor, and a second capacitor, a base of the second transistor is electrically connected to the processor, a collector of the second transistor is electrically connected to the optical module, an emitter of the second transistor is electrically connected to the power source module via the second resistor, one terminal of the second capacitor is electrically connected to the base of the second transistor, and the other terminal of the second capacitor is electrically connected to the power source module.

17. The electronic device of claim 16, wherein the second transistor is a PNP type bipolar junction transistor.

* * * * *